United States Patent [19]

Curtis

[11] Patent Number: 4,875,223
[45] Date of Patent: Oct. 17, 1989

[54] TWISTED PAIR ADAPTER

[75] Inventor: Robert A. Curtis, Marlboro, Mass.

[73] Assignee: Digital Equipment Corporation, Manyard, Mass.

[21] Appl. No.: 93,974

[22] Filed: Sep. 8, 1987

[51] Int. Cl.$^4$ .......................... H04B 3/00; H04L 25/00
[52] U.S. Cl. ...................................... 375/36; 375/121; 333/177
[58] Field of Search ............... 375/4, 36, 121; 333/25, 333/26, 177, 178, 180; 307/270

[56] References Cited

U.S. PATENT DOCUMENTS

| | | | |
|---|---|---|---|
| 3,428,919 | 2/1969 | Webb | 333/25 |
| 3,812,292 | 5/1974 | Tink et al. | 375/36 |
| 3,875,332 | 4/1975 | Fletcher | 375/36 |
| 4,153,848 | 5/1979 | Miyazaki | 375/36 |
| 4,395,688 | 7/1983 | Sellers | 333/178 |
| 4,445,222 | 4/1984 | Smitt | 375/36 |
| 4,479,228 | 10/1984 | Crane | 375/36 |
| 4,502,026 | 2/1985 | Imazeki et al. | 333/25 |
| 4,649,548 | 3/1987 | Crane | 375/36 |
| 4,712,210 | 12/1987 | Davis et al. | 370/77 |
| 4,717,896 | 1/1988 | Graham | 333/25 |

Primary Examiner—Robert L. Griffin
Assistant Examiner—Stephen Chin
Attorney, Agent, or Firm—Nutter, McClennen & Fish

[57] ABSTRACT

An adapter for allowing high frequency local area network signals to be transmitted over low cost twisted pair cable. The adapter performs two functions, to act as a converter to match the impedance of the coaxial cable to that of twisted pair cable, as well as an output balancer, to insure that the alternating current or high frequency components of the signals sent over the twisted pair cable are complementary. Only one of the complementary signals carries DC collision information.

18 Claims, 1 Drawing Sheet

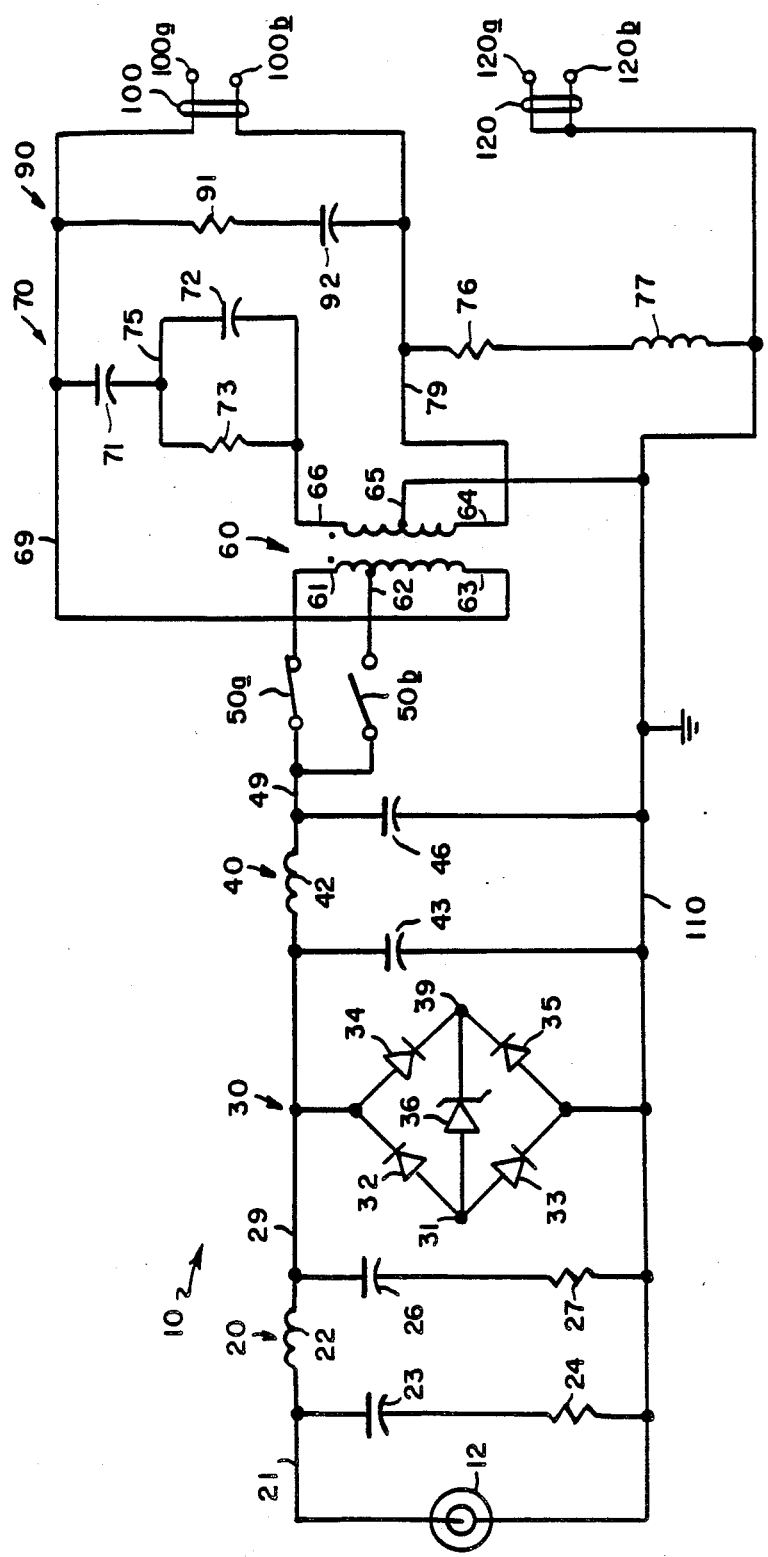

TWISTED PAIR ADAPTER

FIELD OF THE INVENTION

This invention relates generally to the field of data communications, and particularly to an adapter for coupling signals between twisted pair cables and the coaxial cables used in local area networks.

BACKGROUND OF THE INVENTION

Twisted pair cables have long been a cost effective way to send electrical communication signals over short distances, such as inside an office building. At first, these communication signals included only the voice signals from telephones. Later, it became common to also use twisted pair to transmit the data signals associated with computer devices. Twisted pair worked well for sending data signals when only a few computer terminals needed to be directly connected to a central computer, in point-to-point fashion.

With the advent of inexpensive personal computers, and the resulting growth in the use of computers by almost every office worker, today's office building typically has computer devices in every room. To interconnect so many devices in point-to-point fashion is neither practical nor cost effective, since rarely is it necessary for every device to communicate with all other devices at the same instant.

Certain communication signalling techniques, widely known as local area networks or LANs, are becoming a popular way to interconnect large numbers of computer devices located within the same building. Using these techniques, each device can communicate with any other device at a given time, by sending LAN data signals in the form of packets over a single, shared cable.

Because many devices are sharing the single cable, each packet must be transmitted at a high speed, if the time for sending a message of a given length is to remain about the same as when the devices were connected point-to-point.

Several problems can occur if LAN signals are sent over twisted pair. First, the LAN signals have high frequency or alternating current (AC) components representative of the high speed data packets. Secondly, the LAN signals are very susceptible to corruption by external noise sources, such as nearby telephone or video equipment. This is especially true because LAN signals typically are unbalanced, that is, they also have a direct current (DC) component. The DC component is used to determine when two or more devices try to transmit at the same time. The DC component must be faithfully reproduced at to each device connected to the cable if this contention over the use of the cable is to be identified.

The use of shielded coaxial cable can prevent most corruption from external noise sources while accurately transmitting the AC components as well. Shielded coaxial cable also reduces radio emissions caused by the AC components, making it easier to meet the regulations of the Federal Communications Commission.

Conventional wisdom is that shielded coaxial cable, rather than twisted pair, should normally be used to transmit LAN signals. As a result, LAN installation usually involves wiring the building with new coaxial cables. Coaxial cable is more expensive than twisted pair cable.

SUMMARY OF THE INVENTION

It is an object of this invention to provide an adapter for allowing local area network (LAN) signals to be sent and received over twisted pair cable.

In brief summary, an adapter constructed in accordance with the invention receives a LAN signal as a composite signal including both an AC component and a DC component, over a coaxial cable and, in response thereto, generates two data signals for transmission over a twisted pair cable. A first data signal has an AC component and a DC component, which are representative of the AC and DC components, respectively, of the LAN signal as received over the coaxial cable. A second data signal has only an AC component which is complementary to the AC component of the first data signal. The adapter also receives two incoming data signals, one with both an AC and a DC component and the other with a complementary AC component, from the twisted pair cable, and provides a composite LAN signal having both AC and DC components.

The adapter includes a transformer circuit which includes a transformer having a primary winding and a secondary winding. An input terminal of the primary winding is connected to receive the composite LAN signal, and an output terminal of the primary winding is connected to a node to provide a signal representative of the DC component of the LAN signal. The AC component of the LAN signal is coupled to the secondary winding. One terminal of the secondary winding is connected, through a crossover network, to the node, so that the signal at the node represents the sum of the DC and AC components. This signal is coupled to one of the lines in the twisted pair. The other terminal of the secondary winding is connected directly to the second line of the twisted pair.

For a first data signal received from the twisted pair cables, the crossover network also effectively separates its DC component and AC component. The separated DC component is directed to the output terminal of the primary winding. The separated AC component, as well as a second data signal received over the twisted pair and having only a complementary AC component, are coupled through the secondary into the primary winding, to provide a composite LAN signal.

A low pass filter may be connected to the transformer's primary winding to further assist in providing an impedance match to the coaxial cable.

A voltage limiting bridge may be connected between the low pass filter and the transformer's primary, to help protect devices connected to the coaxial cable from an overvoltage which may be passed from the twisted pair cable.

If desired, the transformer's secondary winding may have a center tap, which is connected to a ground node, to provide a ground reference signal. This enables improved operation when the two complementary signals are transmitted over a first twisted pair and the ground reference is transmitted over a second twisted pair.

In order to accommodate twisted pair cables of various impedances, the transformer primary winding may also have several taps. Switches are then used to select a path to the primary winding having the proper impedance.

The adapter has several functions. One function is to act as an impedance converter, that is, to convert the impedance of the coaxial cable to the impedances typical of twisted pair. Another function is output balancing, to ensure the AC components of the two twisted pair signals remain complementary over a range of operating conditions. The adapter is bi-directional -- that is, it allows signals to properly pass in both directions between the coaxial cable and the twisted pair cables.

There are several advantages to the foregoing arrangement. A twisted pair cable having an adapter on each end may be used to transmit LAN signals, instead of a shielded coaxial cable. Thus, older computer installations can make use of their existing twisted pair cable to upgrade to LAN equipment. In new installations, twisted pair cable can be used instead of the more expensive coaxial cable.

Sending complementary signals over the twisted pair insures that radio frequency radiation is within the limits specified by the Federal Communications Commission (FCC). Complementary signalling also reduces noise susceptibility to selected limits.

Because the adapter is bi-directional, only one adapter needs to be manufactured for both transmitting and receiving. This avoids having to use two different types of adapters, which inevitably results in confusion, as sometimes happens with other types of adapters, such as those used with the standard RS232 interface.

Unlike other LAN adapters, this adapter works without the need for large, expensive, low bandwidth common mode transformers.

BRIEF DESCRIPTION OF THE DRAWING

This invention is pointed out with particularity in the appended claims. The above and further advantages of the invention may be better understood by referring to the following description in conjunction with the accompanying Figure, which depicts a schematic circuit diagram of an adapter constructed in accordance with the invention.

DETAILED DESCRIPTION OF ILLUSTRATIVE EMBODIMENTS

Referring now to the Figure, there is shown an adapter 10 for connection between a coaxial cable (not shown) at coaxial terminal 12 and one or more twisted pair cables (not shown) at twisted pair terminals 100 and 120. The adapter 10 includes a first low pass filter 20, a bridge 30, a second low pass filter 40, switches 50a and 50b, an impedance matching and balancing transformer 60, a crossover network 70, and a leakage compensating network 90.

Adapter 10 receives local area network (LAN) signals from the coaxial cable at the coax terminal 12 and accurately transmits signals representative of such LAN signals over the twisted pair cables connected to the twisted pair terminals 100a and 100b and/or the twisted pair terminals 120a and 120b. Adapter 10 also receives signals from the twisted pair terminals 100a, 100b, 120a and 120b and accurately transmits signals representative of them over a coaxial cable connected to the coax terminal 12.

In brief summary, an adapter 10 constructed in accordance with the invention operates on a LAN signal that is a composite signal including both an AC component and a DC component, and generates a first and a second data signal for transmission over the twisted pair cable. The first data signal, coupled to a terminal 100a, has both an AC component and a DC component representative of the AC and DC components, respectively, of the LAN signal as received at the coax terminal 12. The second data signal, coupled to terminal 100b, has only an AC component which is the complement of the AC component of the first data signal. The adapter 10 also receives two incoming data signals, one with both an AC and a DC component at terminal 100a, and the other with a complementary AC component at terminal 100b, from the twisted pair cable and provides a composite LAN signal having both AC and DC components to coax terminal 12.

The adapter includes a transformer circuit 60 comprising a transformer having a primary winding and a secondary winding. An upper terminal 61 of the primary winding is connected to receive the composite LAN signal, and a lower terminal 63 of the primary winding is connected to a node 69. In this fashion, a signal representative of the DC component of the LAN signal is provided at node 69. The AC component of the LAN signal is coupled to the secondary winding of transformer 60. An upper terminal 66 of the secondary winding is connected, through crossover network 70, to the node 69, so that the signal at the node 69 represents the sum of the DC and AC components. The node 69 is coupled over one of the lines in the twisted pair via terminal 100a. The lower terminal 64 of the secondary winding is connected directly to the second line of the twisted pair via terminal 100b.

For the signals that are received from the twisted pair cable at terminals 100a via node 69, the crossover network 70 effectively divides them into signals representative of their DC component and an AC component. The DC component is directed to the lower terminal 63 of the primary winding. The AC component from both the signal at node 69, and the signal fed to node 79 via terminal 100b having only the AC component, are both coupled from the secondary into the primary winding of the transformer 60.

The components of adapter 10 will now be discussed in greater detail. They will be described as though to follow a signal from the coax terminal 12 to the twisted pair terminals 100 and 120 (from left to right as shown in the Figure), but it should be understood that signals also flow from right to left as well. In other words, the components of adapter 10 are bidirectional.

The first low pass filter 20 has two signal access points, a first node 21, which is connected to receive the LAN signal at coax terminal 12, and a second node 29, nearer the twisted pair terminals 100 and 120. A ground access point is provided for filter 20 via ground node 110. The center conductor of coax terminal 12 is connected to node 21. The outer or ground conductor of coax terminal 12 is connected to the ground node 110.

Filter 20 includes an inductor 22 having a first terminal connected to node 21, and a second terminal connected to node 29. A capacitor 23 and resistor 24 are connected in series between node 21 and ground node 110. Likewise, a series capacitor 26 and resistor 27 are connected between node 29 and ground node 110. The impedance of filter 20 should appear the same from both node 21 and node 29. Thus, the resistances of resistor 24 and resistor 27 are equal, and the capacitances of capacitor 23 and capacitor 26 are nearly equal. The high frequency response of filter 20 has been found to be a bit more uniform if the capacitance of capacitor 26 is a bit smaller than that of capacitor 23. It is thought that this effect be due to capacitance contributed between nodes 29 and 110 by the bridge 30.

The LAN signal typically provided by coax terminal 12 comprises a phase modulated signal offset at a constant voltage. The LAN signal thus has two types of signal components, namely high frequency alternating current (AC) components contributed by the phase modulated signal, and constant or low frequency direct current (DC) components contributed by the constant offset voltage. The circuit elements of the first low pass filter 20 are chosen so that it presents a nearly constant impedance for frequencies ranging from near DC to a frequency higher than the highest frequency AC component of the LAN signal. If the LAN signals are of the Ethernet type, for example, this constant impedance of filter 20 should be 50 ohms. Ethernet is a registered trademark of the Xerox Corporation of Stamford, Connecticut.

The bit transfer rate of an Ethernet LAN signal is typically 10 million bits per second. However, because of the phase modulation, AC components occur at frequencies from 2.5 Mhz up to 12.5 Mhz. The minimum required Ethernet signalling bandwidth is somewhat higher than that, about 30 Mhz. Because the most important function of filter 20 is to present a constant impedance to coax terminal 12, its actual cutoff frequency can be a bit higher than that, to relax the constraints on its design somewhat. As will be seen shortly, the second low pass filter 40 has a cutoff frequency closer to the allowed bandwidth.

The nearly constant impedance presented to coax terminal 12 by first low pass filter 20 avoids any impedance mismatch condition between coax terminal 12 and adapter 10. If an impedance mismatch, especially at the higher AC component frequencies, is avoided, the adapter 10 will emit only a minimal amount of radiation, so as to satisfy the regulations of the Federal Communications Commission (FCC).

The bridge 30, which is a conventional rectifier limiting bridge, is connected between node 29 and ground node 110. Bridge 30 includes four rectifying diodes 32, 33, 34, and 35, and a transorb 36. The anodes of diodes 32 and 33 are connected at a node 31. The cathodes of diodes 34 and 35 are connected at another node 39. The cathode of diode 32 is connected to the anode of diode 34 at node 29. The cathode of diode 33 is connected to the anode of diode 35 at the ground node 110. The transorb 36 is connected between nodes 31 and 39.

The bridge 30 performs a DC limiting function, so as to protect circuitry associated with computer devices connected to the coaxial cable connected to coax terminal 12. Specifically, it protects these circuits from an overvoltage condition that may be passed to such circuitry from the twisted pair cables via twisted pair terminals 100 and 120. Such an overvoltage condition might occur, for example, if the twisted pair cables inadvertently couple to the ringing signal from a nearby telephone wire. This coupling might occur, for example, by induction, and generate a high voltage signal in the twisted pair cable connected to either of the twisted pair terminals 100 or 120. The bridge 30 must not, however, adversely affect the DC component of a normal LAN signal. For an Ethernet LAN signal, the DC offset voltage level can range from 0 volts to about negative 10 volts. The zener voltage of transorb 36 is, therefore, chosen so that the bridge 30 limits the voltage difference between nodes 29 and 110 to a somewhat higher voltage, preferably on the order of 16 volts.

The second low pass filter 40 includes an inductor 42 connected between node 29 and another node 49, a first capacitor 43 connected between node 29 and ground node 110, and a second capacitor 46 connected between node 49 and ground node 110. Because the bridge 30 contributes a small capacitance between nodes 49 and 110, its capacitance should be considered in selecting the component value of capacitor 43. Thus, the capacitance of capacitor 4 plus the capacitance of bridge 30 should be equal to that of capacitor 46, to insure the reactance seen by node 29 is about the same as that seen by node 49.

As does the first low pass filter 20, the second low pass filter 40 assists in complying with the LAN specifications and FCC regulations. In particular, filter 40 insures that any AC components transmitted over the twisted pairs via terminals 100 and 120 are within the allowed bandwidth, which, as previously mentioned for an Ethernet LAN, is about 30 Mhz. The values of the components of filter 40 are accordingly selected to achieve this 30 Mhz cutoff.

Thus, while both filters 20 and 40 perform a low pass filter function, the first low pass filter 20 is designed to be a better impedance match to the coaxial cable, and the second low pass filter 40 is designed to be a better attenuator of unwanted high frequency AC components above the LAN signalling bandwidth.

One or more switches 50a and 50b may be disposed between node 49 and the transformer 60 to facilitate selection of one of several different impedance paths from coax terminal 12 to transformer 60. Only one path is normally enabled at a given time. In this fashion, twisted pair cables having different impedances may be accommodated. The path having the lower impedance accommodates a higher impedance twisted pair cable. In the illustrated embodiment, switch 50a is closed and 50b opened to accommodate a lower impedance, such as 100 ohms, twisted pair cable. With the switch 50a open and 50b closed, a higher impedance twisted pair, such as 120 ohm, is accommodated.

The transformer 60 has a primary winding with an upper terminal 61 and a lower terminal 63. Transformer 60 also has a center-tapped secondary with a lower terminal 64, a center tap 65, and an upper terminal 66. Transformer 60 is connected between the second filter 40 and the twisted pair terminals 100 and 120. Note that the twisted pair terminals 100 include two upper terminals 100a and 100b, just as the twisted pair terminals 120 include two lower terminals 120a and 120b.

More particularly, the upper terminal 61 of the primary of transformer 60 is connected through node 49 (and thus the low pass filters 20 and 40 and the bridge 30) to the center conductor of the coax terminal 12. The primary's lower terminal 63 is connected to the upper terminal 100a through an upper node 69. The secondary's lower terminal 64 is connected to the terminal 100b through a lower node 79. The secondary's center tap 65 is connected to both of the lower terminals 120a and 120b through ground node 110.

In the illustrated embodiment, then, transformer 60 provides two impedance transformed, complementary data signals to the upper terminals 100a and 100b. Transformer 60 also provides ground reference signals at the lower terminals 120a and 120b. If only a single twisted pair cable is available, it is connected to receive the complimentary data signals at the upper terminals 100a and 100b. However, the rise time of the DC component of the data signals transmitted over the twisted pair has been found to be faster if a second twisted pair cable, connected to the lower terminals 120a and 120b, is also used. This is probably because the second twisted pair provides a lower impedance transmission path.

The transformer 60 has several functions. One function is to allow the DC components of the LAN signal, that is, those containing LAN contention information, to properly pass between the coax terminal 12 and the upper terminal 100a. Another function is to insure that the AC components of the LAN signal, those containing the phase modulated data signal, are properly coupled between the coax terminal 12 and both of the upper terminals 100a and 100b. To optimize the transmission of the AC components, there are provided complementary, or mirror image, data signals to the upper terminals 100a and 100b, through nodes 69 and 79.

How these functions are performed can be understood by tracing the DC and AC signal paths between the primary of transformer 60 and nodes 69 and 79. The DC component arrives at the primary upper terminal 61 from the center conductor of coax terminal 12. It passes through the primary winding of transformer 60 to its lower terminal 63, and then directly to node 69. The primary winding thus appears as a series inductor to effectively block any AC or varying DC components from being directly coupled from node 49 to node 69. A DC resistance is added by this series winding. The DC path from the outer conductor of the coax terminal 12 is directly through ground node 110 to the secondary center tap 65. The secondary winding, from its center tap 65 to lower terminal 64, also acts as a series inductor, to prevent any AC components from directly reaching node 79. The DC component is thus faithfully reproduced across nodes 69 and 79, with lower node 79 serving as a ground reference. The transformer 60 itself serves to effectively block any direct path for DC components from the primary to the secondary winding.

With regard to the AC signal path, since the upper secondary terminal 66 and lower secondary terminal 64 are equally spaced from the center secondary terminal 65, and center tap 65 is tied to a ground reference via node 110, the transformer 60 always presents AC impedances of equal magnitude and opposite phase to the nodes 69 and 79. Thus, the two signals provided to nodes 69 and 79 by transformer 60 will always be complementary. In other words, the transformer 60 provides balanced outputs, at least for the AC components.

The complementary signal at lower node 79 thus has AC components corresponding to those from the LAN signal at the coax terminal 12, and no DC components. The complementary signal at upper node 69 has AC components identical in magnitude but with a phase opposite that of the complementary signal at lower node 79. The complementary signal at upper node 69 also has a DC component corresponding to that of the LAN signal as received at coax terminal 12.

The crossover network 70 further insures that only low frequency DC components pass from node 69 to the upper twisted pair 100, and that the AC components pass properly through the transformer 60. Crossover network 70 also determines which frequencies are considered to be the DC components and coupled only to the upper node 69, and which are considered AC components, and coupled to nodes 69 and 79 in complementary form. In the embodiment for an Ethernet LAN, a crossover frequency of about 1 Mhz has been found to be ideal.

The crossover network 70 is constructed from an upper portion including capacitors 71 and 72 and a resistor 73, as well as a lower portion including a resistor 76 and an inductor 77. Specifically, one terminal of each capacitor 71 and 72 are connected together at a node 75. The other terminal of capacitor 71 is connected to upper node 69, and that of capacitor 72 to the secondary upper terminal 66. The resistor 73 is connected in parallel with capacitor 72, between node 75 and the secondary upper terminal 66. The resistor 76 is connected in series with inductor 77 between the secondary center tap 65 and lower node 79. The upper portion of crossover network 70 is thus connected between the primary and secondary windings of transformer 60.

A problem encountered in the selection of component values for crossover network 70 is maintaining the fast rise and fall times required to support some computer devices, while insuring that the AC components of the signals sent over the twisted pair remain sufficiently complementary to meet the FCC radiation regulations. In the preferred embodiment for Ethernet, this means that the component values for network 70 are chosen so that the rise and fall time are in the 1 to 2 microsecond range, with overshoot limited to about 20 percent.

The capacitor 71 and resistor 73 are chosen to control overshoot in the DC component of the complimentary data signal. Specifically, capacitor 71, in series with capacitor 72, controls the DC component response. The series combination of resistor 76 and inductor 77 are used to effectively lower the magnetizing inductance of the transformer 60, and also to provide, in conjunction with capacitors 71 and 72, and resistor 73, a faster DC signal response time. It has been found that decreasing the capacitance of capacitor 71 results in increased DC component overshoot. Because capacitor 72 is smaller than capacitor 71, it has a greater affect on the AC component response time.

The leakage compensating network 90 includes a series resistor 91 and capacitor 92 connected between nodes 69 and 79. The network 90 compensates for leakage inductance that may occur in the transformer 60, thereby insuring that there is a proper input impedance match at the twisted pair terminals 100 and 120.

It has been mentioned several times that signals also travel from the twisted pair terminals 100 and 120 to the coaxial terminal 12. The components of adapter 10 operate on these signals in similar fashion as described above. Briefly, complementary data signals are received at upper terminals 100a and 100b. Crossover network 70 allows the complementary signals to pass from upper terminal 100a to terminal 66 of the transformer secondary, as well as from the upper terminal 100b to the transformer secondary at terminal 64. Crossover network 70, and especially capacitors 71 and 72, prevent the DC components from upper terminal 100a from reaching the secondary winding of transformer 60. An unbalanced signal containing both AC and DC components is thus developed across the primary of transformer 60, and appears at node 49. A ground reference signal is also developed by transformer 60 and coupled to node 110. The unbalanced signal is then filtered by filter 40, voltage limited by bridge 30, and impedance matched by filter 20, before passing to the center conductor of coax terminal 12.

Adapter 10 has been found to accurately transmit Ethernet LAN signals over twisted pair cables at least 70 meters long. Preferred components for the Ethernet embodiment are as follows:

| | |
|---|---|
| inductors 22,42 | 0.22 μh |

-continued

| | |
|---|---|
| capacitor 23 | 39 pf |
| capacitor 26 | 33 pf |
| resistors 24,27 | 51 ohms |
| diodes 32,33,34,35 | 1N4004 |
| transorb 36 | LCE12, 50 pf |
| capacitor 43 | 18 pf |
| capacitor 46 | 47 pf |
| transformer 60 | PE-64670 |
| capacitor 71 | 4700 pf |
| capacitor 72 | 470 pf |
| resistor 73 | 120 ohms |
| resistor 76 | 10 ohms |
| inductor 77 | 8.2 μh |
| resistor 91 | 100 ohms |
| capacitor 92 | 10 pf |

The LCE12 transorb is manufactured by General Semiconductor Industries, Inc. of Tempe, Arizona. The PE-64670 Transformer is manufactured by Pulse Engineering, Inc. of San Diego, California.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

I claim:

1. An adapter for enabling high frequency data signals to be transmitted over a twisted pair cable, the adapter having first and second adapter terminals, and third and fourth adapter terminals, the adapter comprising:
    A. a network, for blocking passage of low-frequency, direct current (DC) components of the data signals, and for passing high-frequency, alternating current (AC) components of the data signals; and
    B. a transformer, having
        (i) a primary winding with upper and lower terminals, the upper primary terminal connected to the first adapter terminal, the lower primary terminal connected to the third adapter terminal, the primary winding providing a path for the low frequency, direct current (DC) components of the data signals between the first and third adapter terminals; and
        (ii) a secondary winding with an intermediate tap forming upper and lower windings, and providing in-phase and opposite-phase high frequency alternating current (AC) components of the data signals at upper and lower secondary terminals, respectively, the intermediate tap connected to the second adapter terminal, the upper secondary terminal coupled to the third adapter terminal through the network, to pass the in-phase AC components between the upper secondary terminal and the third adapter terminal, and to block passage of the DC components via the secondary winding to the fourth adapter terminal, and the lower secondary terminal connected to the fourth adapter terminal, to pass the opposite-phase AC components between the lower secondary terminal and the fourth adapter terminal.

2. Apparatus as in claim 1 wherein the intermediate tap of the secondary winding provides a ground reference point for an auxilliary twisted pair cable.

3. Apparatus as in claim 1, additionally comprising:
    C. impedance matching means, coupled between the transformer and the first and second adapter terminals, for matching the impedance of the twisted pair cable at the frequency of the AC components of the data signals.

4. Apparatus as in claim 3 additionally comprising: a low pass filter, fed by the impedance matching means.

5. An adapter for enabling high frequency data signals to be transmitted over a twisted pair cable, the adapter having a first pair of terminals and a second pair of terminals, the adapter comprising:
    A. first means, connected between the first pair of adapter terminals and a first terminal of the second pair of adapter terminals, for passing low frequency, direct current (DC) components of the data signals;
    B. second means, connected between the first pair of adapter terminals and the first terminal of the second pair of adapter terminals, for passing high frequency, alternating current (AC) components of the data signals; and
    C. third means, connected between the first pair of adapter terminals and a second terminal of the second pair of adapter terminals, for passing signal components which represent the complement of the AC components of the data signals.

6. Apparatus as in claim 5 additionally comprising:
    D. impedance matching means, coupled to the first pair of adapter terminals, for matching the impedance of the twisted pair cable.

7. A circuit for coupling a local area network data signal received from a coaxial cable to a twisted pair cable, the circuit comprising:
    a transformer having an upper primary terminal, a lower primary terminal, an upper secondary terminal, a center secondary terminal, and a lower secondary terminal, the upper primary terminal coupled to a center conductor of the coaxial cable, the center secondary terminal coupled to a ground conductor of the coaxial cable, the lower primary terminal coupled to a first one of the wires of the twisted pair, and the lower secondary terminal coupled to receive a second one of the wires of the twisted pair; and
    a crossover network, coupled between the upper secondary terminal of the transformer and the first twisted pair wire, for allowing only lower frequency components of the local area network data signal to pass between the lower primary terminal and the first twisted pair wire.

8. Apparatus as in claim 7 where the crossover network additionally passes higher frequency components between the upper primary terminal and the twisted pair as complementary signals.

9. Apparatus as in claim 7 where the crossover network comprises:
    a first capacitor having one terminal connected to the lower primary terminal of the transformer, and the other terminal connected to a first node;
    a second capacitor having one terminal connected to the first node and the other terminal connected to the upper secondary terminal of the transformer; and a first resistor having one terminal connected to the first node and the other terminal connected to the upper secondary terminal of the transformer.

10. Apparatus as in claim 7 additionally comprising:
first impedance matching network means, coupled across the center conductor and the ground conductor of the coaxial cable, for providing a frequency-independent impedance match between the adapter and the coaxial cable.

11. Apparatus as in claim 10 wherein the first impedance matching network means comprises:
an inductor, coupled between the center conductor of the coaxial cable and the upper primary terminal;
first and second capacitors; and
first and second resistors, with the first capacitor and first resistor coupled in series between the center conductor and the ground conductor, and the second capacitor and second resistor coupled in series between the upper primary terminal and the ground conductor.

12. Apparatus as in claim 7 additionally comprising:
a low pass filter, coupled between the center conductor of the coaxial cable and the upper primary of the transformer.

13. Apparatus as in claim 12 wherein the low pass filter comprises:
an inductor, having a first terminal coupled to the center conductor, and a second terminal connected to the upper primary terminals; and
first and second capacitors, the first capacitor coupled between the first terminal of the inductor and the ground conductor of the coaxial cable, and the second capacitor coupled between the second inductor terminal and the ground conductor.

14. Apparatus as in claim 7 additionally comprising:
second impedance matching network means, coupled across the first and second wires of the twisted pair cable, for providing a frequency-independent impedance match between the adapter and the twisted pair cable.

15. Apparatus as in claim 10 additionally comprising:
second impedance matching network means, coupled across the first and second wires of the twisted pair cable, for providing a frequency-independent impedance match between the adapter and the twisted pair cable.

16. Apparatus as in claim 7 additionally comprising:
a leakage compensating network coupled across the first and second wires of the twisted pair cable.

17. Apparatus as in claim 7 where the center secondary terminal of the transformer is connected to both wires of an auxiliary twisted pair cable.

18. Apparatus as in claim 17 additionally comprising:
a resistor; and
an inductor, connected in series with the resistor, the resistor and inductor connected between the lower secondary terminal of the transformer and the ground conductor.

* * * * *